US012779389B2

(12) United States Patent
Seynaeve et al.

(10) Patent No.: US 12,779,389 B2
(45) Date of Patent: Nov. 3, 2026

(54) MOBILE FILTER DEVICE

(71) Applicant: Desotec NV, Roeselare (BE)

(72) Inventors: Rikie Seynaeve, Roeselare (BE); Jeroen Callewaert, Zwevegem (BE); Mathias Meersseman, Helkijn (BE); Johan Craeye, Izegem (BE)

(73) Assignee: Desotec NV, Roeselare (BE)

( * ) Notice: Subject to any disclaimer, the term of this patent is extended or adjusted under 35 U.S.C. 154(b) by 894 days.

(21) Appl. No.: 18/071,836

(22) Filed: Nov. 30, 2022

(65) Prior Publication Data

US 2024/0173664 A1 May 30, 2024

(51) Int. Cl.

*B01D 53/02* (2006.01)
*B01D 46/00* (2022.01)
*B01D 53/81* (2006.01)
*B01J 20/20* (2006.01)

(52) U.S. Cl.

CPC ........... *B01D 53/02* (2013.01); *B01D 46/001* (2013.01); *B01D 53/81* (2013.01); *B01J 20/20* (2013.01); *B01D 2253/102* (2013.01); *B01D 2257/206* (2013.01); *B01D 2257/304* (2013.01); *B01D 2257/306* (2013.01); *B01D 2257/406* (2013.01); *B01D 2257/602* (2013.01); *B01D 2257/7022* (2013.01); *B01D 2257/7027* (2013.01); *B01D 2259/455* (2013.01)

(58) Field of Classification Search

None

See application file for complete search history.

(56) References Cited

U.S. PATENT DOCUMENTS

| | | | |
|---|---|---|---|
| 3,961,918 A | 6/1976 | Johnson | |
| 3,961,919 A | 6/1976 | Lamoreaux | |
| 5,558,688 A | 9/1996 | Cowan et al. | |
| 5,730,181 A | 3/1998 | Doyle et al. | |
| 6,149,718 A | 11/2000 | Cowan et al. | |
| 2004/0231517 A1* | 11/2004 | van der Maas | G01N 1/4077 55/420 |
| 2005/0223901 A1 | 10/2005 | van der Maas | |
| 2012/0321418 A1* | 12/2012 | Bohman | B65D 90/002 414/222.07 |

FOREIGN PATENT DOCUMENTS

| | | | |
|---|---|---|---|
| DE | 201 07 489 U1 | 8/2001 | |
| EP | 0 123 086 A2 | 10/1984 | |
| EP | 0 123 086 A3 | 5/1985 | |
| EP | 0 388 883 A2 | 9/1990 | |
| EP | 0 388 883 A3 | 3/1991 | |
| EP | 1 479 428 A2 | 11/2004 | |
| EP | 1 479 428 A3 | 3/2005 | |
| FR | 898345 A | 4/1945 | |
| WO | 2000/023783 A2 | 4/2000 | |
| WO | 2000/023783 A3 | 8/2007 | |
| WO | WO-2017220518 A1 * | 12/2017 | B01D 35/30 |

* cited by examiner

*Primary Examiner* — Jelitza M Perez

(74) *Attorney, Agent, or Firm* — Amster, Rothstein & Ebenstein LLP

(57) ABSTRACT

The present application concerns a mobile filter device configured for cleaning a gas and/or fluid stream, comprising a coupling platform provided, in the top surface, with an inlet and outlet for repeatable coupling to a corresponding inlet and outlet of the mobile filter device, and provided, in the side surface, with an inlet and outlet for coupling to a corresponding inlet and outlet of an industrial installation.

18 Claims, 5 Drawing Sheets

A-A

A-A

MOBILE FILTER DEVICE

FIELD OF THE INVENTION

Figure 1:
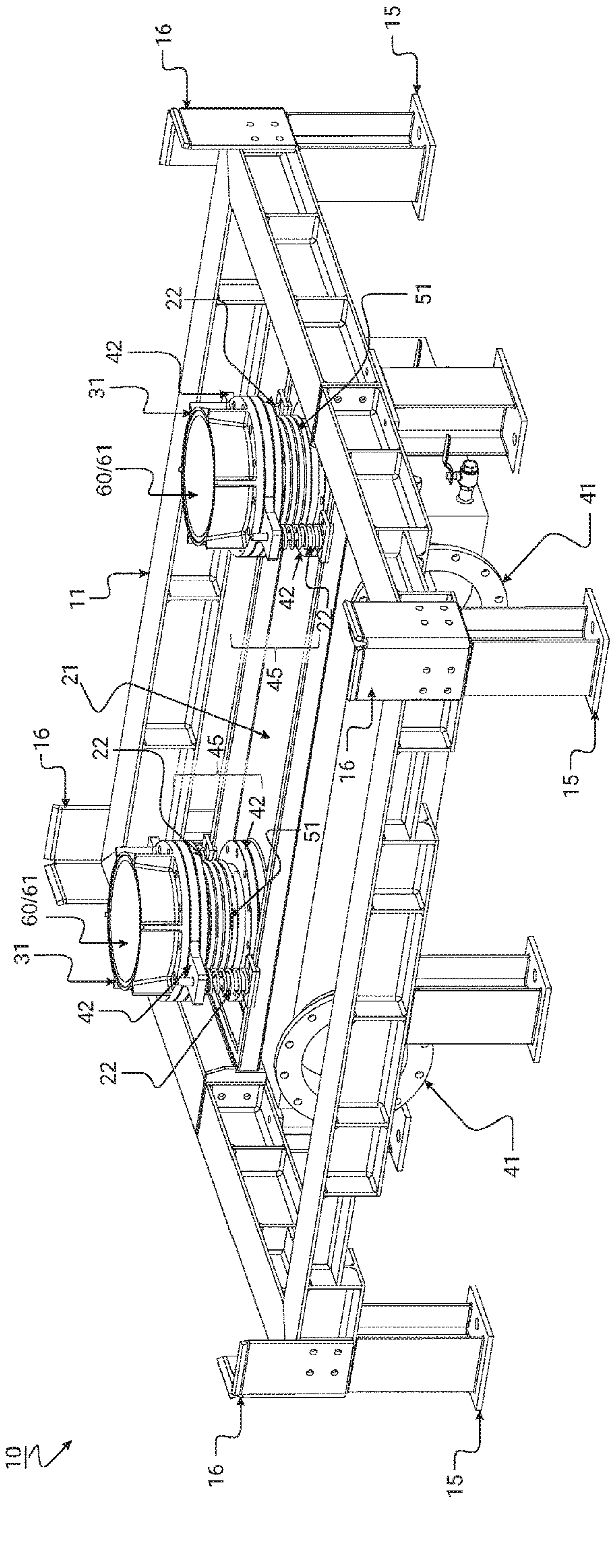

The present application concerns a mobile filter device configured for cleaning a gas and/or fluid stream, comprising a coupling platform provided, in the top surface, with an inlet and outlet for repeatable coupling to a corresponding inlet and outlet of the mobile filter device, and provided, in the side surface, with an inlet and outlet for coupling to a corresponding inlet and outlet of an industrial installation.

BACKGROUND OF THE INVENTION

In many industrial processes, gases escape which pollute the ambient air. This pollution may consist of sulphates, nitrates, heavy metals, organic contaminants and/or other harmful, irritating components and odors. This pollution may be countered by means of various techniques such as for example air or gas washing, biological filtration, active charcoal filtration and after-burning.

Often, in industrial installations, filters are provided which capture the contaminating substances from the air, water and ground. The filters contain active charcoal which acts as a sponge and absorbs pollution. The use of active charcoal filters has the advantage that the active charcoal is reusable after reactivation, whereby there is no need to always supply new active charcoal. Such circular filter solutions are consequently sustainable solutions for the ecological problems facing industrial companies.

However, when the active charcoal filter reaches the end of its service life, it must be replaced by a new filter device and the saturated active charcoal filter transferred to a facility where it can be regenerated. In this way, the active charcoal can be reused. Therefore the filter devices are often mobile units which can easily be transported from and to industrial installations.

However, because the mobile filter devices must frequently be connected and disconnected at industrial installations, this often causes leaks at the coupling points which must be connected each time between the mobile filter device and the fixed installation of the user. The repeated manipulation, connection and disconnection means that the coupling pieces are susceptible to wear and consequently form a weak link in the process. A leak in the coupling pieces is not always noticed promptly and can lead to serious environmental damage. The present invention offers a solution to these problems.

SUMMARY OF THE INVENTION

The present invention concerns a coupling platform which is fixedly connected to an industrial installation and on which a mobile filter device can be coupled without the need for manual coupling of the inlet and outlet of the mobile filter device.

Accordingly, the present invention provides a coupling platform for a mobile filter device configured for cleaning a gas and/or fluid stream, comprising:

- a frame composed of an outer frame and an inner frame;
- wherein the outer frame comprises a plurality of base supports arranged at least at the corners of the outer frame;
- a wherein the inner frame comprises a filter coupling and an installation coupling which are fluidically connected together;

- the filter coupling comprising at least one inlet and at least one outlet which are configured for repeatable coupling to a corresponding inlet/outlet of the mobile filter device;
- the installation coupling comprising at least one inlet and at least one outlet which are configured for coupling to a corresponding inlet/outlet of an industrial installation;
- wherein the filter coupling is arranged on a top surface of the inner frame and the installation coupling on a side surface, so that the inlets/outlets stand approximately at right angles to one another; and
- wherein the filter coupling comprises a movably arranged connector which is configured for connection to an inlet/outlet of the mobile filter device; and a clamping means which is configured to clamp said connector against said inlet/outlet.

In particular, the coupling platform according to the invention provides that the connector comprises

- at least two flanges placed one above the other;
- a length-adjustable pipe which connects the at least two flanges together; and
- a compression spring arranged between the at least two flanges and configured for extending the pipe.

In particular, the coupling platform according to the present invention provides that the connector comprises a hopper with a wider inlet which is configured to close a supply/discharge pipe of the mobile filter device, and a narrower outlet which is configured to conduct a gas and/or fluid stream to the filter coupling.

In particular, the coupling platform according to the present invention provides that the installation coupling comprises a flange coupling which is configured for coupling to a supply/discharge pipe of the industrial installation.

In particular, the coupling platform according to the present invention provides that the filter coupling, preferably the connector, is configured for the supply/discharge of a gas stream with a flow of maximum 5000 $m^3/h$, preferably 4500 $m^3/h$, more preferably 4000 $m^3/h$, or a fluid stream with a flow of maximum 100 $m^3/h$.

In particular, the coupling platform according to the present invention provides that the outer frame comprises a plurality of stops which are arranged at least at the corners of the outer frame and configured to fix foot supports provided on a base surface of the mobile filter device.

In particular, the coupling platform according to the present invention provides that the outer frame comprises further base supports which are arranged between the base supports arranged at the corners of the outer frame.

In a further embodiment, the present invention provides a mobile filter assembly comprising a mobile filter device configured for cleaning a gas and/or fluid stream and the coupling platform according to the invention described herein, wherein the mobile filter device comprises at least one inlet and at least one outlet which are arranged on a base surface of the mobile filter device; and wherein the base surface of the mobile filter device is placed on the top surface of the coupling platform for coupling of the corresponding inlet/outlet to the filter coupling of the coupling platform.

In particular, the mobile filter assembly according to the present invention provides that the mobile filter device comprises a plurality of foot supports which are configured for placing on the outer frame of the coupling platform; preferably for placing against the stops provided on the outer frame.

In particular, the mobile filter assembly according to the present invention provides that the inlet and outlet of the mobile filter device are configured for the supply/discharge of a gas stream with a flow of maximum 5000 $m^3$/h, preferably 4500 $m^3$/h, more preferably 4000 $m^3$/h, or a fluid stream with a flow of maximum 100 $m^3$/h.

In particular, the mobile filter assembly according to the present invention provides that the mobile filter device is filled with active charcoal.

In particular, the mobile filter assembly according to the present invention provides that the mobile filter device is configured for filtering a gas stream consisting of air, another gas and/or combination of gases; preferably nitrogen, carbon dioxide and/or methane, from which organic and inorganic pollutants must be removed, such as preferably aliphatic hydrocarbons, aromatic hydrocarbons, sulphur- and nitrogen-bonded organic components, halogenated organic components, hydrogen sulphide, ammonia and/or mercury.

In particular, the mobile filter assembly according to the present invention provides that the mobile filter device is configured for filtering a fluid stream consisting of waste water and/or another fluid such as vegetable or similar oils, pyrolysis oils, and organic fluid streams such as (bio) ethanol, amino acid solutions etc.

In a further embodiment, the present invention provides a use of a coupling platform according to the invention described herein, for coupling a mobile filter device to an industrial installation.

In particular, the use according to the present invention provides that the coupling platform is used for the supply/discharge of a gas stream with a flow of maximum 5000 $m^3$/h, preferably 4500 $m^3$/h, more preferably 4000 $m^3$/h, or a fluid stream with a flow of maximum 100 $m^3$/h.

In particular, the use according to the present invention provides that the coupling platform is used for the supply/discharge of a gas stream consisting of air, another gas and/or combination of gases; preferably nitrogen, carbon dioxide and/or methane, from which organic and inorganic pollutants must be removed, such as preferably aliphatic hydrocarbons, aromatic hydrocarbons, sulphur- and nitrogen-bonded organic components, halogenated organic components, hydrogen sulphide, ammonia and/or mercury.

In particular, the use according to the present invention provides that the coupling platform is used for the supply/discharge of a fluid stream consisting of waste water and/or another fluid such as vegetable or similar oils, pyrolysis oils, and organic fluid streams such as (bio)ethanol, amino acid solutions etc. in a further embodiment, the present invention provides a method for coupling a mobile filter device to a coupling platform according to the invention described herein, comprising the steps:

(a) mounting said coupling platform with a desired orientation of the filter coupling and installation coupling;
(b) transporting a mobile filter device in a horizontal position with a transport means to against the coupling platform;
(c) tilting the mobile filter device into an upright position in such a manner that the foot supports of the mobile filter device are placed on the outer frame of the coupling platform;
(d) coupling the inlet/outlet of the filter coupling to a corresponding inlet/outlet of the mobile filter device.

In particular, the method according to the present invention provides that step a) comprises a coupling of the inlet/outlet of the installation coupling to the corresponding inlet/outlet of the industrial installation.

In particular, the method according to the present invention provides that step (c) comprises fixing the foot supports of the mobile filter device by stops arranged on the outer frame of the coupling platform.

In particular, the method according to the present invention provides that step (d) comprises an automatic connection of a connector around a supply/discharge pipe of the mobile filter device by means of a clamping means such as a compression spring.

FIGURES

FIG. 1: an illustration of an example of a coupling platform for a mobile filter device as described in this application.

Figure 2:
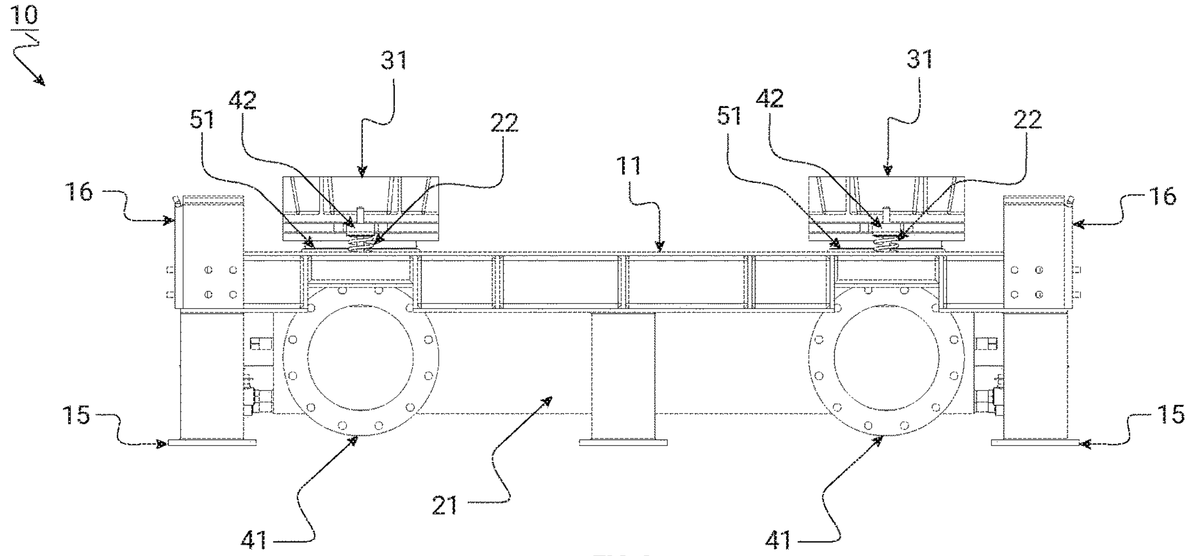

FIG. 2: a side view of an exemplary embodiment of a coupling platform for a mobile filter device as described in this application, from a viewing angle looking onto the side face with the inlet and outlet to the industrial installation.

Figure 3:
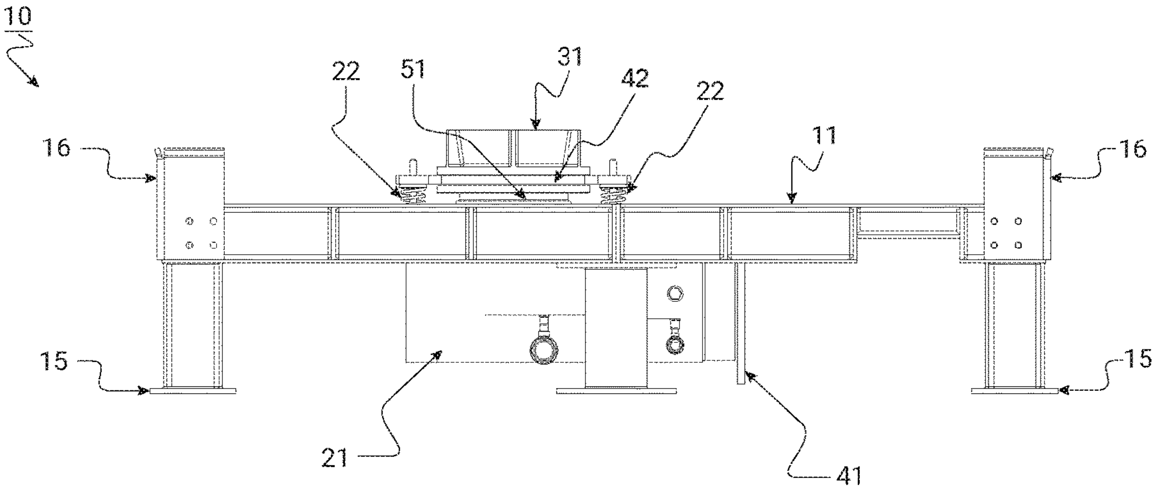

FIG. 3: a side view of an exemplary embodiment of a coupling platform for a mobile filter device as described in this application, from a viewing angle transversely to the side face with the inlet and outlet to the industrial installation.

Figure 4:
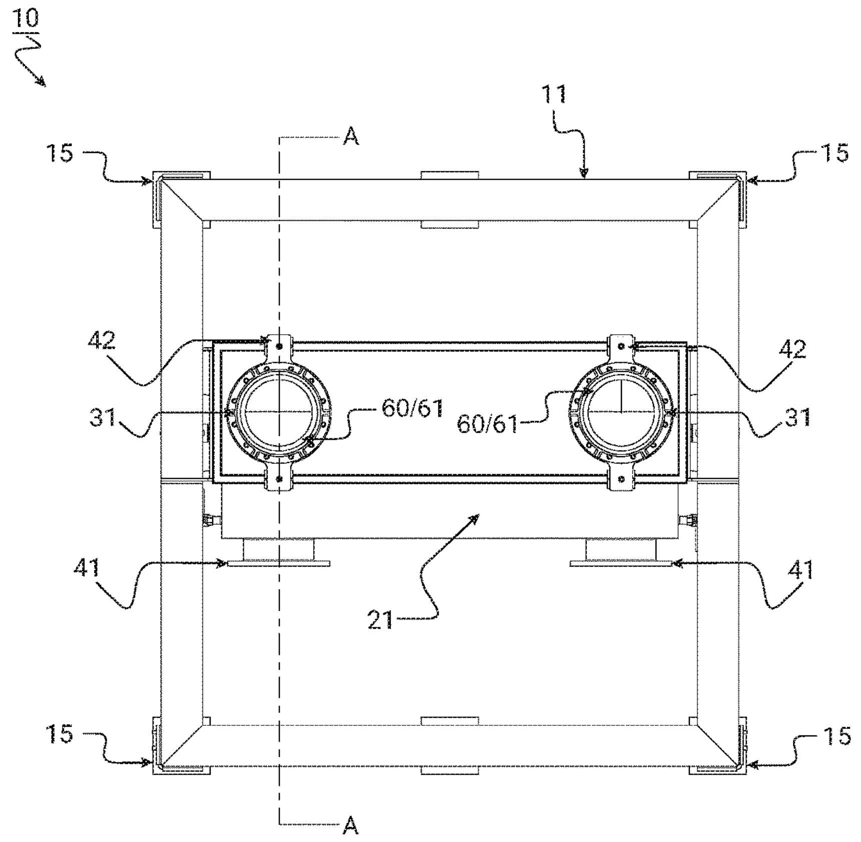

FIG. 4: a top view of an exemplary embodiment of a coupling platform for a mobile filter device as described in this application.

Figure 5:
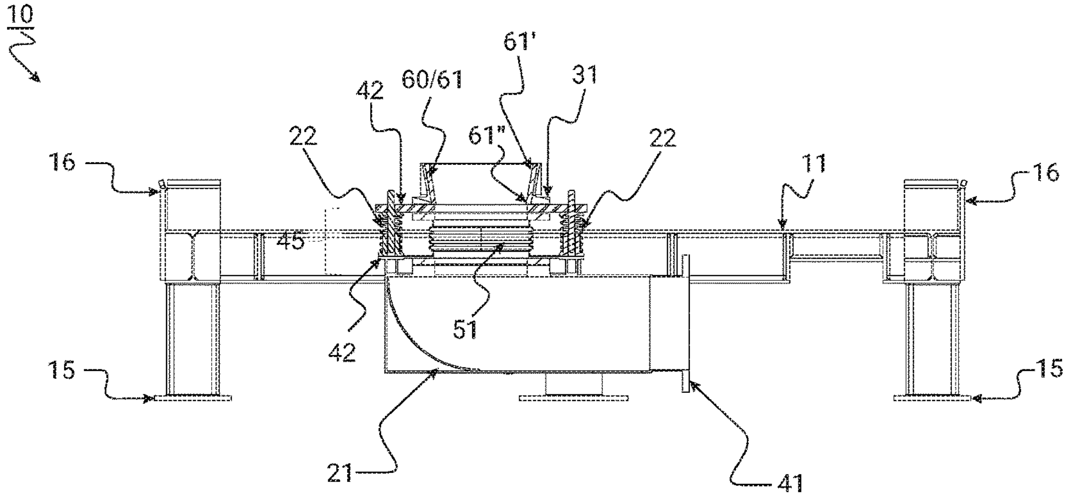

FIG. 5: a cross-section of an exemplary embodiment of a coupling platform for a mobile filter device as described in this application along line A-A (see FIG. 4).

Figure 6:
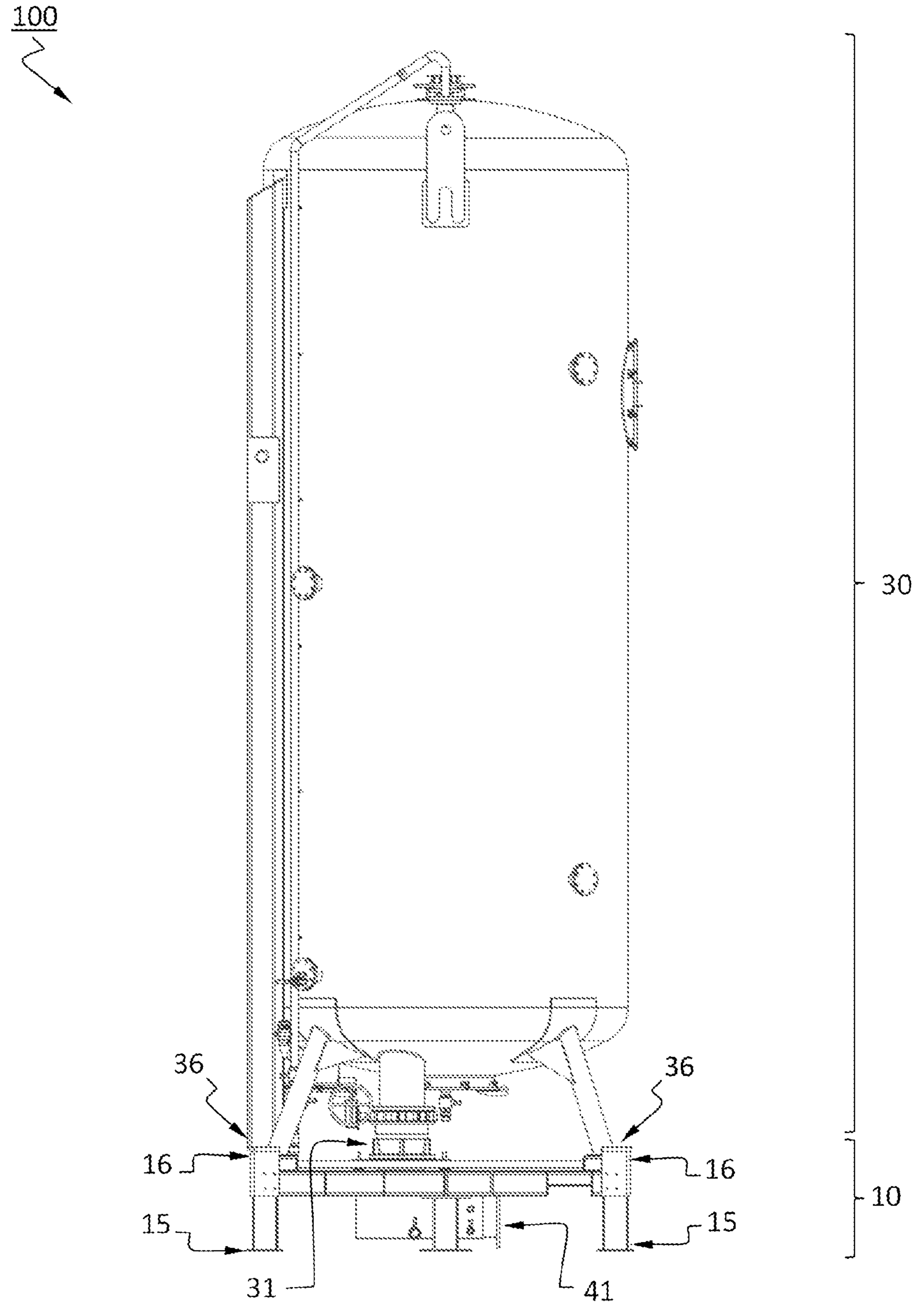

FIG. 6: an illustration of an exemplary embodiment of a coupling platform with mobile filter device as described in this application.

Figure 7:
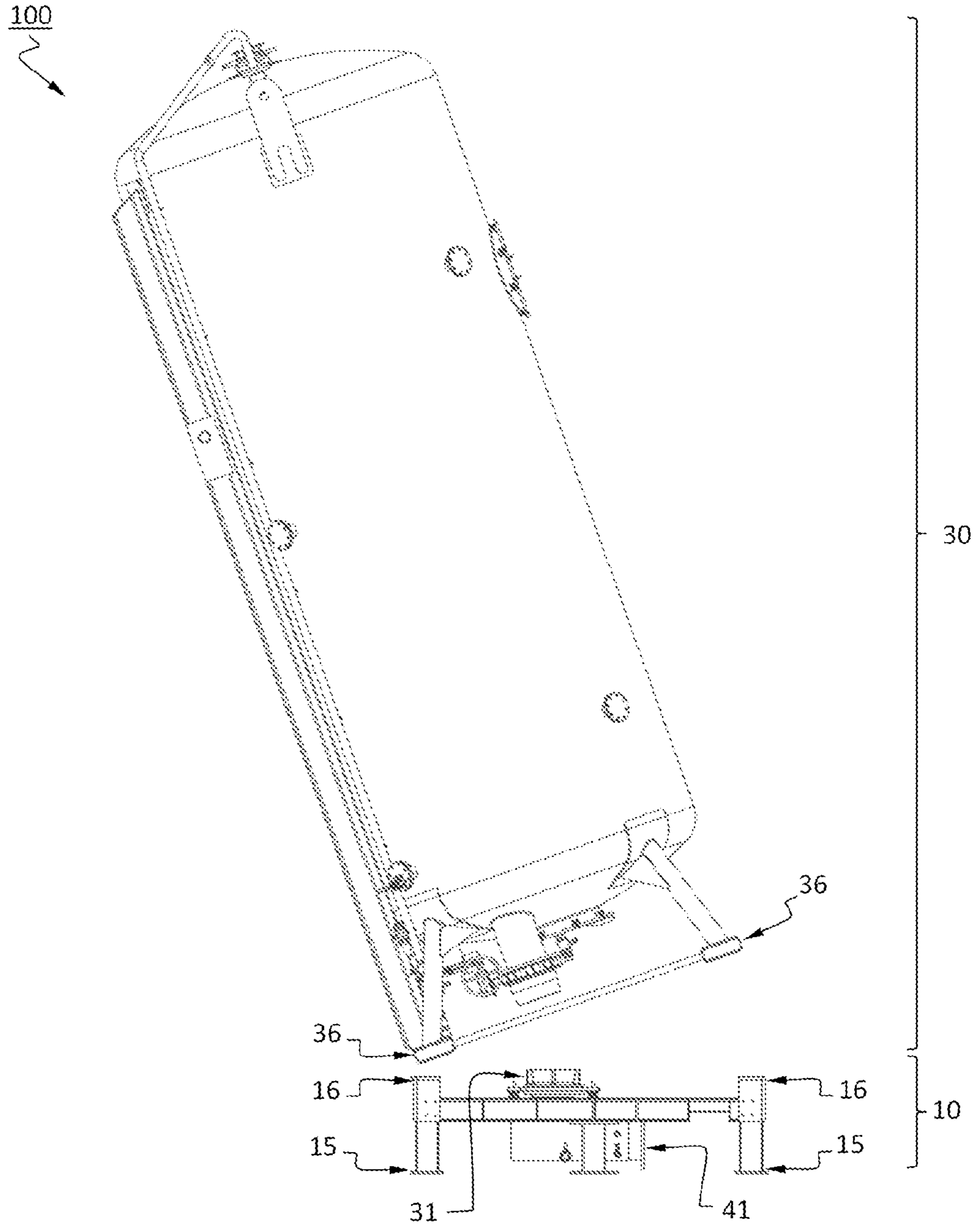

FIG. 7: an illustration of an exemplary embodiment of a coupling platform on which a mobile filter device is placed as described in this application.

Numbering: coupling platform (10); outer frame (11); base support (15); stop (16); inner frame (21); compression spring (22); mobile filter device (30); filter coupling (31); filter device foot support (36); installation coupling (41); mobile filter assembly (100).

DESCRIPTION OF THE INVENTION

Before the present system and method of the invention are described, it must be understood that this invention is not restricted to specific systems and methods or combinations as described herein, since such systems and methods and combinations may vary. It should also be clear that the terminology used in this application is not intended to be restrictive, since the scope of the present invention is limited solely by the appended claims.

As used in this application, the singular forms "a" and "the" comprise both the singular and the plural unless the context clearly indicates otherwise.

The terms "comprise", "comprises" and "composed of" as used in this application are synonymous with "inclusive", "including", "containing" or "contains", and are inclusive or open-ended and do not exclude additional unnamed parts, elements, components or method steps.

It should be clear that the terms "comprising", "comprises" or "composed of" as used in this application include the terms "consisting of" and "consists of".

The listing of numerical ranges with endpoints comprise all figures and fractions which fall within the associated ranges, including specified endpoints.

The term "approximate" or "roughly" as used in this application with reference to a measurable value such as a parameter, a quantity, a time duration etc., means variations of +/−10% or less, preferably +/−5% or less, more preferably +/−1% or less, and even more preferably +/−0.1% or less, of the specified value, insofar as these variations are suitable for implementation in the invention described herein. It should be understood that the value to which the modifier "approximate" or "roughly" refers is itself also specifically and preferably described.

Although the terms "one or more" or "at least one", and one or more elements or at least one element of the group of elements, are clear in themselves, the terms also comprise, by way of further explanation, a reference to one of said elements or each arbitrary two or more of said elements, and each arbitrary ≥3, ≥4, ≥5, ≥6, or ≥7 of said elements, and up to all said elements.

All references given in the present description are hereby included by reference in full. In particular, the teaching of all references to which specific reference is made in this application is included by reference.

Unless defined otherwise, all terms as used in the description of the invention, including technical and scientific terms, have the meaning usually understood by someone with average knowledge of the field to which this invention belongs. As a further guidance, definitions are included for better understanding of the teaching of the present invention.

In the following passages, various aspects of the invention are defined in more detail. Each aspect so defined may be combined with any other aspect or aspects unless clearly specified to the contrary. In particular, any arbitrary feature which is indicated as preferred or advantageous may be combined with any other arbitrary feature or any arbitrary other features which are described as preferred or advantageous.

Reference in this description to "an embodiment" or "one embodiment" means that a specific feature, structure or property described in conjunction with the embodiment is present in at least one embodiment of the present invention. Thus the phrases "in one embodiment" or "in an embodiment" used at various points in this description do not necessarily all refer to the same embodiment but may well do so. Furthermore, the specific features, structures or properties may be combined in any suitable fashion in one or more embodiments, as will be clear from this description to the person skilled in the art. Although specific embodiments as described in this application contain some features which are included in other embodiments, but others which are not, combinations of features of different embodiments are also intended to fall within the scope of the invention and form separate embodiments, as will be clear to the person skilled in the art. In the appended claims, for example each of the claimed embodiments may be used in any arbitrary combination.

In the present description of the invention, reference is made to the appended drawings which form part thereof and which illustrate, purely by way of explanation, specific embodiments in which the invention may in practice be implemented. References in brackets or in bold linked to specific elements illustrate the elements concerned as examples, wherein there is no intention to restrict the elements concerned. It must be understood that other embodiments may be used, and structural or logical changes may be made, without leaving the scope of the present invention. The following detailed description should therefore not be regarded as restrictive, and the scope of the present invention is defined by the appended claims.

The present invention concerns a coupling platform which is fixedly connected to an industrial installation and on which a mobile filter device may be coupled without the need for manual coupling of the inlet and outlet of the mobile filter device.

Accordingly, the present invention provides a coupling platform 10 for a mobile filter device 30 configured for cleaning a gas and/or fluid stream, comprising:

- a frame composed of an outer frame 11 and an inner frame 21;
- wherein the outer frame 11 comprises a plurality of base supports 15 arranged at least at the corners of the outer frame 11;
- wherein the inner frame 21 comprises a filter coupling 31 and an installation coupling 41 which are fluidically connected together;
- the filter coupling 31 comprising at least one inlet and at least one outlet which are configured for repeatable coupling to a corresponding inlet/outlet of the mobile filter device 30;
- the installation coupling 41 comprising at least one inlet and at least one outlet which are configured for coupling to a corresponding inlet/outlet of an industrial installation;
- wherein the filter coupling 31 is arranged on a top surface of the inner frame 21 and the installation coupling on a side surface, so that the inlets/outlets stand approximately at right angles to one another; and
- wherein the filter coupling 31 comprises a movably arranged connector which is configured for connection to an inlet/outlet of the mobile filter device 30; and a clamping means which is configured to clamp said connector against said inlet/outlet.

As used in this application, the term "filter device" refers to any arbitrary porous device for removing impurities or solid particles from a liquid or a gas which passes through it. Examples of filter methods as known in the art and as generally used in the industry may comprise but are not limited to biological filtering, carbon filters, adsorption beds, sand filtration, two-layer filtration, resin-ion exchange and similar. Preferably, the filter may be an active charcoal filter which uses a bed of active charcoal to remove contaminants and impurities by means of physico-chemical adsorption, wherein contaminating molecules in the fluid to be treated are captured in the pore structure of the carbon substrate. Alternatively, other methods may be used for processing corrosive or extremely reactive substances, such as wet cleaning, cleaning with gas or air, combustion and similar. These alternative methods are in particular usable for processing corrosive or extremely reactive substances which are very difficult or impossible to clean using filtration methods.

As used in this application, the term "mobile filter device" or "interchangeable filter device" refers to a filter device which is designed to be transported as a load, preferably by means of a motorized vehicle as generally used for transporting tank containers. More preferably, the motorized vehicle is equipped with a lifting device which is able to move the mobile filter device onto a location or remove it from a location. Most preferably, it is able to place the mobile filter device in an upright position and transport the mobile filter device in a flat position. Examples of a transport device are known in the trade and belong to devices which are generally used by the industry, without being restricted thereto, such as a truck, forklift truck, boat, train etc.

The coupling platform 10 as provided in the present invention is provided in an installation which forms the coupling between the mobile filter device 30 and the industrial installation. The coupling platform ensures that the gas and/or liquid streams which must be filtered can flow from the industrial installation to the mobile filter device and that the filtered gas and/or liquid streams can flow back from the mobile filter device to the industrial installation. The coupling platform comprises an outer frame 11 which ensures the stability of the installation. This is necessary since the mobile filter device is preferably placed in an upright position on the coupling platform. The outer frame contains a plurality of base supports 15 at the corners of the outer frame. The coupling platform also comprises an inner frame 21 which ensures a fluidic coupling of the gas and/or liquid streams between the mobile filter device and the industrial installation. Therefore the inner frame comprises a filter coupling 31 and an installation coupling 41 with which are fluidically connected together. The installation coupling 41 comprises at least one inlet and at least one outlet which ensure the coupling to a corresponding inlet/outlet of the industrial installation. The installation coupling is placed on a side surface of the inner frame/coupling platform. On installation of the coupling platform, the connection of the installation coupling to the industrial installation takes place once. Once the connection has been made, it need not be disconnected again, which is advantageous for the wear and safety of the installation. The coupling can also preferably be made permanent. The filter coupling 31 comprises at least one inlet and at least one outlet which ensure the coupling to the corresponding inlet/outlet of the mobile filter device. The filter coupling is placed on the top surface of the inner frame/coupling platform. This allows the mobile/interchangeable filter device to be positioned vertically on the coupling platform. The filter coupling also comprises a movably arranged connector which ensures the connection to the inlet/outlet of the mobile filter device, and a clamping means which is configured to clamp the connector against said inlet/outlet. By using a movably arranged connector in combination with a clamping means, the inlet and outlet of the mobile filter device are automatically tightened when placed on the coupling platform and fluidically coupled to the gas and/or fluid streams from the industrial installation without manual coupling being required. This contributes to the safety, flexibility and durability of the installation.

In particular, the coupling platform 10 according to the invention provides that the connector comprises

- at least two flanges placed one above the other;
- a length-adjustable pipe which connects the at least two flanges together; and
- a compression spring 22 arranged between the at least two flanges and configured for extending the pipe.

This structure of the connector ensures automatic coupling of the inlet and outlet of the mobile filter device to the gas and/or liquid streams of the industrial installation when placed on the coupling platform. Since the mobile filter device is preferably placed vertically on the coupling platform, the weight of the mobile filter device ensures sufficient pressure on the connector to ensure that the fluidic connection is leak-free.

In particular, the coupling platform 10 according to the present invention provides that the connector comprises a hopper with a wider inlet which is configured to close a supply/discharge pipe of the mobile filter device 30, and a narrower outlet which is configured to conduct a gas and/or fluid stream to the filter coupling 31. The hopper form ensures that small positional deviations of the inlet/outlet of the mobile filter device relative to the inlet/outlet of the filter coupling can be corrected when the mobile filter device is positioned on the coupling platform.

In particular, the coupling platform 10 according to the present invention provides that the installation coupling 41 comprises a flange coupling which is configured for coupling to a supply/discharge pipe of the industrial installation.

Preferably, the inner frame is fixedly positioned and/or fixedly welded in the coupling platform so that it cannot change position. In another preferred embodiment, the inner frame is secured movably (in translation, rotation, tilting) to the coupling platform, which may offer more flexibility on installation of the coupling platform and coupling of the platform to the industrial installation.

In particular, the coupling platform 10 according to the invention provides that the filter coupling 31, preferably the connector, is configured for the supply/discharge of a gas stream with a flow of maximum 5000 $m^3$/h, preferably 4500 $m^3$/h, more preferably 4000 $m^3$/h, or a fluid stream with a flow of maximum 100 $m^3$/h.

In particular, the coupling platform 10 according to the present invention provides that the outer frame 11 comprises a plurality of stops 16 which are arranged at least at the corners of the outer frame 11 and configured to fix foot supports 36 which are provided on a base surface of the mobile filter device 30.

In particular, the coupling platform 10 according to the present invention provides that the outer frame 11 comprises further base supports 15 which are arranged between the base supports 15 arranged at the corners of the outer frame 11.

In a further embodiment, the present invention provides a mobile filter assembly 100 comprising a mobile filter device 30 configured for cleaning a gas and/or fluid stream and the coupling platform 10 according to the invention described herein, wherein the mobile filter device 30 comprises at least one inlet and at least one outlet which are arranged on a base surface of the mobile filter device 30; and wherein the base surface of the mobile filter device 30 is placed on the top surface of the coupling platform 10 for coupling of the corresponding inlet/outlet to the filter coupling of the coupling platform 10.

The installation as described herein has the advantage that part of the installation (the coupling platform) can be fixedly installed on the industrial installation. During the first installation, all connections are coupled. This single coupling prevents stress and wear caused by repeated coupling and uncoupling, and also makes it possible to connect the coupling pieces in a more efficient and permanent manner. In addition, the coupling platform makes it possible to connect and disconnect the mobile filter device to/from the coupling platform repeatedly without causing too much wear and without manual actions being required.

In particular, the mobile filter assembly 100 according to the present invention provides that the mobile filter device 30 comprises a plurality of foot supports 36 which are configured for placing on the outer frame 11 of the coupling platform 10; preferably for placing against the stops 16 provided on the outer frame 11.

In particular, the mobile filter assembly 100 according to the present invention provides that the inlet and outlet of the mobile filter device 30 are configured for the supply/discharge of a gas stream with a flow of maximum 5000 $m^3$/h, preferably 4500 $m^3$/h, more preferably 4000 $m^3$/h, or a fluid stream with the flow of maximum 100 $m^3$/h.

In particular, the mobile filter assembly 100 according to the present invention provides that the mobile filter device 30 is filled with active charcoal.

In particular, the mobile filter assembly 100 according to the present invention provides that the mobile filter device 30 is configured for filtering a gas stream consisting of air, another gas and/or combination of gases; preferably nitrogen, carbon dioxide and/or methane, from which organic and inorganic pollutants must be removed, such as preferably aliphatic hydrocarbons, aromatic hydrocarbons, sulphur- and nitrogen-bonded organic components, halogenated organic components, hydrogen sulphide, ammonia and/or mercury.

In particular, the mobile filter assembly according to the present invention provides that the mobile filter device is configured for filtering a fluid stream consisting of waste water and or another fluid such as vegetable or similar oils, pyrolysis oils, and organic fluid streams such as (bio) ethanol, amino acid solutions etc.

In a further embodiment, the present invention provides the use of a coupling platform 10 according to the invention described herein, for coupling a mobile filter device 30 to an industrial installation.

In particular, the use according to the present invention provides that the coupling platform 10 is used for the supply/discharge of a gas stream with a flow of maximum 5000 $m^3$/h, preferably 4500 $m^3$/h, more preferably 4000 $m^3$/h, or a fluid stream with a flow of maximum 100 $m^3$/h.

In particular, the use according to the present invention provides that the coupling platform 10 is used for the supply/discharge of a gas stream consisting of air, another gas and/or combination of gases; preferably nitrogen, carbon dioxide and/or methane, from which organic and inorganic pollutants must be removed, such as preferably aliphatic hydrocarbons, aromatic hydrocarbons, sulphur- and nitrogen-bonded organic components, halogenated organic components, hydrogen sulphide, ammonia and/or mercury.

In particular, the use according to the present invention provides that the coupling platform is used for the supply/discharge of a fluid stream consisting of waste water and or another fluid such as vegetable or similar oils, pyrolysis oils, and organic fluid streams such as (bio)ethanol, amino acid solutions etc.

In a further embodiment, the present invention provides a method for coupling a mobile filter device 30 to a coupling platform 10 according to the invention described herein, comprising the steps:

(a) mounting said coupling platform 10 with a desired orientation of the filter coupling 31 and installation coupling 41;
(b) transporting a mobile filter device 30 in a horizontal position with a transport means to against the coupling platform 10;
(c) tilting the mobile filter device 30 into an upright position in such a manner that the foot supports 36 of the mobile filter device 30 are placed on the outer frame 11 of the coupling platform 10;
(d) coupling the inlet/outlet of the filter coupling 31 to a corresponding inlet/outlet of the mobile filter device 30.

In particular, the method according to the present invention provides that step (a) comprises a coupling of the inlet/outlet of the installation coupling 41 to the corresponding inlet/outlet of the industrial installation.

In particular, the method according to the present invention provides that step (c) comprises fixing the foot supports 36 of the mobile filter device 30 by stops 16 arranged on the outer frame 11 of the coupling platform 10.

In particular, the method according to the present invention provides that step (d) comprises an automatic connection of a connector around a supply/discharge pipe of the mobile filter device 30 by means of a clamping means such as a compression spring.

Examples

FIGS. 1, 2, 3, 4 and 5 illustrate an example of a coupling platform for a mobile filter device as described herein from various views. The coupling platform 10 comprises a frame composed of an outer frame 11 and inner frame 21, wherein the outer frame 11 comprises a plurality of base supports 15 arranged at least at the corners of the outer frame 11; wherein the inner frame 21 comprises a filter coupling 31 and installation coupling 41 which are fluidically connected together; the filter coupling 31 comprises at least one inlet and at least one outlet which are configured for repeatable coupling to the corresponding inlet/outlet of the mobile filter device 30; the installation coupling 41 comprises at least one inlet and at least one outlet which are configured for coupling to a corresponding inlet/outlet of an industrial installation; wherein the filter coupling 31 is arranged on a top surface of the inner frame 21 and the installation coupling on a side surface, so that the inlets/outlets stand at approximately a right angle relative to one another; wherein the filter coupling 31 comprises a movably arranged connector which is configured for connection to an inlet/outlet of the mobile filter device 30; and a clamping means which is configured for clamping the connector against said inlet/outlet.

FIGS. 6 and 7 illustrates an exemplary embodiment of a coupling platform with mobile filter device as described in this application and the manner in which the mobile filter device 30 is coupled to the coupling platform.

The invention claimed is:

1. A coupling platform for a mobile filter device configured for cleaning a gas and/or fluid stream, comprising:
- a frame composed of an outer frame and an inner frame;
- wherein said outer frame comprises a plurality of base supports arranged at least at the corners of said outer frame;
- wherein said inner frame comprises a filter coupling and an installation coupling which are fluidically connected together;
- said filter coupling comprising at least one inlet and at least one outlet which are configured for repeatable coupling to a corresponding inlet/outlet of said mobile filter device;
- said installation coupling comprising at least one inlet and at least one outlet which are configured for coupling to a corresponding inlet/outlet of an industrial installation;
- wherein said filter coupling is arranged on a top surface of said inner frame and the installation coupling on a side surface, so that the inlets/outlets stand approximately at right angles to one another; and
- wherein said filter coupling comprises a movably arranged connector which is configured for connection to the inlet/outlet of said mobile filter device; and a clamping means which is configured to clamp said connector against said inlet/outlet of the mobile filter device, wherein said connector comprises
  - at least two flanges placed one above the other;
  - a length-adjustable pipe which connects the at least two flanges together; and
    - a compression spring arranged between said at least two flanges and configured for extending said pipe.

2. The coupling platform 10 according to claim 1, wherein said clamping means comprises a hopper with a wider inlet which is configured to close a supply/discharge pipe of said mobile filter device, and a narrower outlet which is configured to conduct a gas and/or fluid stream to said filter coupling.

3. The coupling platform according to claim 1, wherein said installation coupling comprises a flange coupling which is configured for coupling to a supply/discharge pipe of an industrial installation.

4. The coupling platform according to claim 1, wherein said filter coupling is configured for the supply/discharge of a gas stream with a flow of maximum 5000 $m^3/h$ or a fluid stream with a flow of maximum 100 $m^3/h$.

5. The coupling platform according to claim 1, wherein said outer frame comprises a plurality of stops which are arranged at least at the corners of said outer frame and configured to fix foot supports provided on a base surface of said mobile filter device.

6. The coupling platform according to claim 1, wherein said outer frame comprises further base supports which are arranged between said base supports arranged at the corners of said outer frame.

7. A mobile filter assembly comprising a mobile filter device configured for cleaning a gas and/or fluid stream and the coupling platform according to claim 1, wherein said mobile filter device comprises at least one inlet and at least one outlet which are arranged on a base surface of said mobile filter device; and wherein the base surface of said mobile filter device is placed on the top surface of said coupling platform for coupling of the corresponding inlet/outlet to the filter coupling of said coupling platform.

8. The mobile filter assembly as claimed in claim 7, wherein said mobile filter device comprises a plurality of foot supports which are configured for placing on said outer frame of said coupling platform.

9. The mobile filter assembly according to claim 7, wherein the inlet and outlet of said mobile filter device are configured for the supply/discharge of a gas stream with a flow of maximum 5000 $m^3/h$.

10. The mobile filter assembly according to claim 7, wherein said mobile filter device is filled with active charcoal.

11. The mobile filter assembly according to claim 7, wherein said mobile filter device is configured for filtering a gas stream consisting of air, another gas and/or combination of gases.

12. The coupling platform according to claim 1, wherein the mobile filter device is coupled to an industrial installation.

13. The coupling platform according to claim 12, wherein the coupling platform is used for the supply/discharge of a gas stream with a flow of maximum 5000 $m^3/h$ or a fluid stream with a flow of maximum 100 $m^3/h$.

14. The coupling platform according to claim 12, wherein the coupling platform is used for the supply/discharge of a gas stream consisting of air, another gas and/or combination of gases.

15. A method for coupling a mobile filter device to a coupling platform according to claim 1, comprising the steps:

(a) mounting said coupling platform with a desired orientation of the filter coupling and installation coupling;

(b) transporting the mobile filter device in a horizontal position with a transport means to against the coupling platform;

(c) tilting the mobile filter device into an upright position in such a manner that foot supports of the mobile filter device are placed on the outer frame of the coupling platform; and (d) coupling the inlet/outlet of the filter coupling to the corresponding inlet/outlet of the mobile filter device.

16. The method according to claim 15, wherein step (a) comprises a coupling of the inlet/outlet of the installation coupling to the corresponding inlet/outlet of the industrial installation.

17. The method according to claim 15, wherein step (c) comprises fixing the foot supports of the mobile filter device by stops arranged on the outer frame of the coupling platform.

18. The method according to claim 15, wherein step (d) comprises an automatic connection of the connector around a supply/discharge of the mobile filter device by means of the clamping means.

* * * * *